United States Patent [19]

Ottow

[11] 4,012,055
[45] Mar. 15, 1977

[54] METHOD AND APPARATUS FOR EXTENDING A MOTORCYCLE FORK

[76] Inventor: Robert J. Ottow, 6815 San Vicente, Paramount, Calif. 90723

[22] Filed: Mar. 22, 1976

[21] Appl. No.: 669,030

[52] U.S. Cl. .................. 280/276; 29/428; 403/272; 267/34

[51] Int. Cl.² ....................... B62K 25/08

[58] Field of Search .......... 280/276, 277, 278, 279; 188/322; 29/428; 267/20 C, 34; 403/271, 272, 302

[56] References Cited

UNITED STATES PATENTS

| 2,259,589 | 10/1941 | Schleicher | 267/34 |
| 2,337,584 | 12/1943 | Baker | 403/271 X |
| 3,556,557 | 1/1971 | Blair | 280/279 |

FOREIGN PATENTS OR APPLICATIONS

| 129,837 | 1/1946 | Australia | 280/276 |
| 579,900 | 8/1946 | United Kingdom | 280/276 |

*Primary Examiner*—Kenneth H. Betts
*Attorney, Agent, or Firm*—Fulwider, Patton, Rieber, Lee & Utecht

[57] ABSTRACT

There is disclosed an extension for a motorcycle fork of the type including a downwardly biased damper and having its upper extremity received in a hollow fork tine and having its bottom extremity secured to the bottom end of a hollow slider which has its upper extremities telescoped over such tine. The bottom wall of the slider is severed from the slider itself and the damper rod extended and severed medially. A damper rod extension of a predetermined length is fitted between the top and bottom sections of such damper rod and has its opposite ends affixed to the medial ends of the damper rod sections. The damper rod is then retracted into the tine and a slider extension formed with an extension chamber having an axial length at least equal to such predetermined length is fitted over the lower end of such damper rod and affixed thereto. The slider extension is then secured to the lower extremity of such slider as by welding.

6 Claims, 3 Drawing Figures

METHOD AND APPARATUS FOR EXTENDING A MOTORCYCLE FORK

BACKGROUND OF THE INVENTION

1. Field of the Invention

The motorcycle fork extension of the present invention relates to a method and apparatus for extending the travel of a motorcycle fork to thus smooth out the ride and enable such motorcycle to accommodate rough terrain without loss of control by the driver.

2. Description of the Prior Art

Motorcycle forks are commonly formed with downwardly opening hollow tines having upwardly opening hollow sliders received thereover with a damper rod secured on its lower extremity to the slider also received telescopically within the tines. The damper rods are commonly biased downwardly within the tines and the up rate and down rate of the slider and tine relative to one another is commonly controlled by orifices formed in the wall of the damper rod to control oil flow past a sealing ring mounted in the lower extremity of such tine and telescopically receiving the hollow damper rod.

While motorcycle forks of this general type are generally acceptable for operation over relatively smooth surfaces such as highways and freeways, the off-road operation of such motorcycles is more demanding and requires considerably more shock absorption to accommodate the rougher terrain without loss of control. For instance, when the conventional motorcycle forks encounter rugged terrain at high rates of speed, resulting in such forks bottoming out, there is a tendency for the handlebars to twist in one direction or the other and for the rider to be pitched over the handlebars.

Efforts to modify such conventional motorcycle forks have led to the addition of overload or helper springs for resisting shock. However, such proposed solutions have been unsatisfactory because they stiffen the suspension system and reduce the absorption rate of such forks and, further, frequently require dampening oil having a relatively high viscosity in order to adequately resist damper rod travel.

SUMMARY OF THE INVENTION

The method and apparatus of present invention is characterized by the provision of a damper rod extension medially in the damper rod and having its opposite end affixed to the upper and lower extremities of the extended damper rod. The bottom wall of the slider is removed and a slider extension having an upwardly opening chamber of at least such predetermined length is affixed to the lower end of such slider and has the bottom end of such damper rod affixed thereto.

The objects and the advantages of the present invention will become apparent when taken in conjunction with the following detailed description of the drawing.

DESCRIPTION OF THE PREFERRED EMBODIMENT

Figure 1:
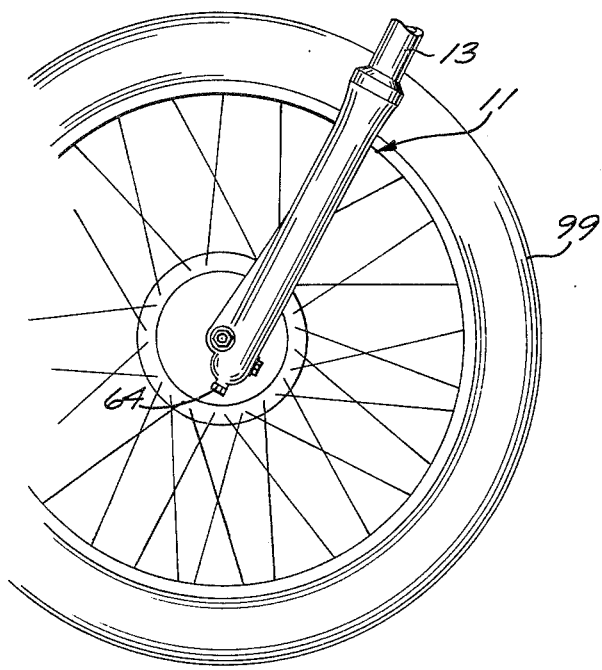
FIG. 1 is a side elevational view of a motorcycle fork which may be extended in accordance with the present invention.
Figure 2:
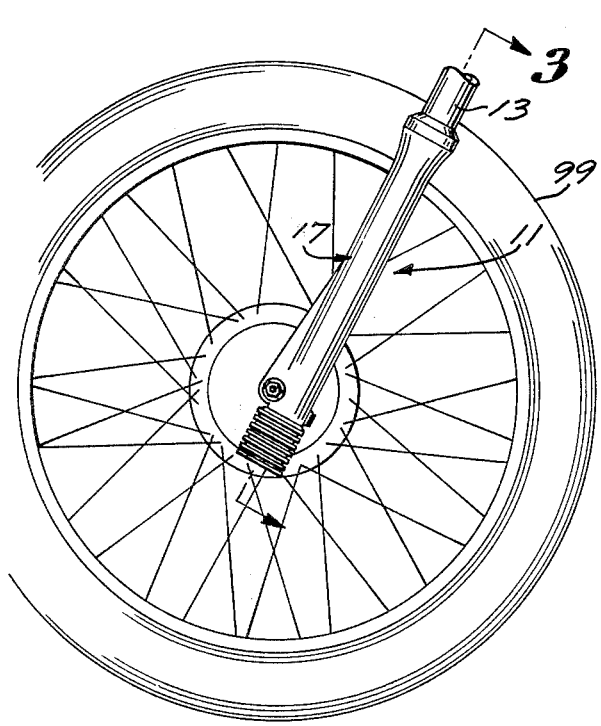
FIG. 2 is an elevational side view of the motorcycle fork shown in FIG. 1, as extended in accordance with the present invention.
Figure 3:
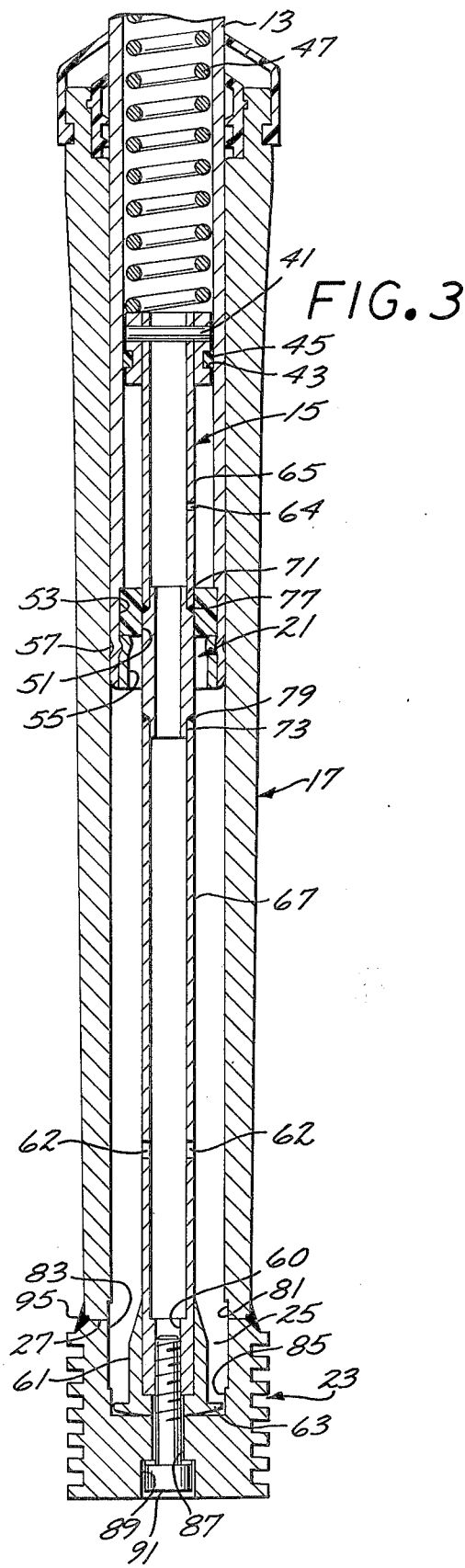
FIG. 3 is a longitudinal, sectional view, in enlarged scale, taken along the lines 3—3 of FIG. 2.

Referring to FIGS. 1 and 3, motorcycle forks, generally designated 11, commonly incorporate, generally, a pair of downwardly and forwardly projecting hollow tines 13 which telescopically receive the upper extremities of hollow damper rods 15 in the lower extremities thereof and have upwardly opening tubular sliders 17 telescoped upwardly thereover. In accordance with the present invention, the bottom extremity of the slider 17 is severed therefrom, the hollow damper rod 15 extended to form upper and lower lengths 29 and 30 and a hollow damper rod extension, generally designated 21 of about one inch in length, is received between the severed ends of such damper rod and affixed thereto. Referring to FIG. 3, a slider extension, generally designated 23, formed with an extension chamber 25 having an axial length of approximately one inch, is then fixed to the severed lower end of such slider to accommodate the extended length of such rod 21. The extended fork will then accommodate approximately one inch of additional travel, thus enhancing the shock loading capability thereof and smoothing out the ride thereon.

It will be appreciated that the overall construction of the motorcycle fork 11 itself conventionally includes a rod 15 having a piston ring 41 mounted on the upper end thereof and formed with an annular outwardly open gland 43 for receipt of an annular sealing ring 45 which wipes the interior wall of the tine 13. The damper rod 15 is biased downwardly by means of a coil spring 47 received within the tine 13 and projects through a resilient sealing ring 51 mounted at the lower extremity of such tine 13. The sealing ring 51 is received in a relief 53 formed in the interior of the lower extremity of such tine 13 and is secured in position by means of a sleeve 55 received telescopically in the lower extremity of such tine and swaged in position by means of a swaging ring 57. The lower extremity of the damper rod is conventionally formed with an axially projecting threaded bore 60 and has a cap, generally designated 61, received thereover, and formed with an enlarged-in-diameter head 63. The lower extremity of the rod 15 is formed with diametrically opposed up rate control orifices 62 and the upper portion thereof is formed with a down rate restricting orifice 64.

Consequently, in order to avoid the inconvenience and expense of removing the entire damper rod 15, when the fork 11 is to be extended, the lower end of the slider 17 is unfastened from the damper rod 15 by removing the stud 64 (FIG. 1) and telescoped downwardly off the tine 13. The damper rod 15 may then be slid to its extended position and such rod severed medially to form upper and lower sections 65 and 67 having proximate clean ends oriented perpendicular to the axis thereof.

The integral bottom wall of the slider 17 is then machined off to form a flat end and a relief 81 machined upwardly into the lower extremity thereof for purposes which will be made clear hereinafter. The slider extension 23 is also formed with a relief 83 having the same diameter as the relief 81 but terminating short of the lower extremity thereof to form an index ring 85 having a diameter which closely fits the head 63 of the damper rod cap 61.

The slider extension 23 is formed in its bottom wall with a downwardly opening axial bore 87 which is formed at its lower extremity with a recess 89 into which the head of an anchoring allen bolt 91 may be received. The periphery of the slide extension 23 is preferably formed with radially projecting annular cooling fins 93.

Thus, the slider 17 may conveniently be telescoped over the extended damper rod 15 and onto the lower extremity of the tine 13 and the extension 23 brought into position, it being appreciated that the indexing ring 85 will accurately center such slider extension with respect to the damper rod 15 because of the close fit between such index ring and the damper rod head 63. It will be noted that if it becomes necessary to grip the damper rod 15 to prevent rotation thereof during tightening of the anchor bolt 91, access thereto may be had between the extension 23 and the actual body of the slider 17.

It is of importance that the interior relief bores 81 and 83 allow for distortion in the walls of the slider 17 and extension 23 resulting from heating during such welding without interference with subsequent axial travel of the damper rod head 63.

After the anchor bolt 91 has been tightened, the upper end of the slider extension 23 may be abutted against the lower extremity of the slider 17 and such extension welded into position by means of a weld bead 95. The fork 11 may then be mounted back on the front wheel 99 and the motorcycle is ready to ride.

Thereafter, a relatively low viscosity dampening oil, such as 20-weight, rather than the normal 30-weight, oil may be poured into the upper end of the tine 13 to fill the fork to the desired level.

In operation, when the front motorcycle wheel 99 encounters an obstacle, upward travel of the slider 17 relative to the tine 13 will be controlled by the rate at which such oil may enter the lower up rate orifices 62 in combination with the resistive force of the spring 47 as dictated by the spring rate thereof. With the additional one inch of travel and the high viscosity oil, it will be appreciated that greater shock loading can be accommodated as a result of the altered characteristics of the down rate of the fork. That is, not only will additional oil volume be forced through the down rate metering orifices 62, but the spring 47 will offer resistance over a greater length of compression thereof, thus absorbing even more energy during such shock loading. Accordingly, the resultant ride will be smoother and bottoming out of such fork avoided in all operations except that over the most drastic and unfriendly terrain.

As the front wheel 99 clears the obstacle and the motorcycle fork extends, it will be appreciated that such extension is closely controlled to thus prevent excessive rebound which may interfere with the smoothness of the ride and control of the motorcycle. The rate of such rebound is controlled as a result of metering of oil from the annular space between the damper rod 15 and tine 13 above the sealing ring 51 and into such rod through the down rate orifice 64, as coupled with the further resistance exhibited by the lower metering orifices 62 controlling flow back out into the annular area between such rod and the slider 17.

From the foregoing, it will be apparent that the motorcycle fork extension of the present invention provides for convenient and economic alteration of conventional motorcycle forks to enable such forks to be operated in off-the-road racing to provide a smooth and controlled ride not otherwise available.

Various modifications and changes may be made with regard to the foregoing detailed description without departing from the spirit of the invention.

I claim:

1. A motorcycle fork extension for extending the travel of a motorcycle fork of the type including a downwardly biased damper rod having a head on the bottom end thereof and a fork slider fitted telescopically over the bottom extremity of a fork tine receiving such rod, said extension comprising:
a damper rod extension of a selected length received medially in said rod and having the opposite ends thereof affixed to the ends of upper and lower sections of said damper rod;
a slider extension affixed to the lower end of said slider and including an upwardly opening cylindrical registration chamber of at least said selected lengths for receipt of said head; and
means affixing the bottom end of said damper rod to said extension.

2. A motorcycle fork extension as set forth in claim 1 wherein:
said damper rod is hollow and said rod extension is formed on its opposite extremities with reduced-in-diameter extremities telescopically received in the proximate extremities of said damper rod.

3. A motorcycle fork extension as set forth in claim 1 wherein:
said slider extension includes cooling fins radiating outwardly therefrom.

4. A method of extending the travel of a motorcycle fork of the type including a damper rod received at its upper extremity in a hollow fork tine and having its bottom end secured to a hollow slider which has its upper extremity telescoped over said tine and having a predetermined length of travel, said method including the following steps:
cutting the bottom wall of said slider off;
extending said damper rod from said tine;
severing said damper rod medially;
separating the upper and lower sections of said damper rod and affixing the opposite ends of a damper extension of a predetermined length to the proximate ends of said upper and lower sections;
forming a slider extension to provide an extension chamber of at least said predetermined length; and
affixing said slider extension to the lower extremity of said slider.

5. A method according to claim 4 wherein said rod includes a circular head on the lower extremity thereof that includes:
the step of forming said slider with a cylindrical relief bore projecting upwardly from the bottom extremity thereof; and
forming said slider with a cylindrical relief bore complementing said first relief bore and terminating in an indexing ring closely fitting said head.

6. A method according to claim 4 that includes:
the step of forming said slider extension with cooling fins radiating outwardly therefrom.

* * * * *